United States Patent [19]
Bravin

[11] 3,934,484
[45] Jan. 27, 1976

[54] TOOTH TRANSMISSION MEMBER UTILIZING PIVOTALLY INTERCONNECTED PREFORMS

[76] Inventor: Ben Bravin, 1365 Midvale Ave., Los Angeles, Calif. 90024

[22] Filed: Jan. 17, 1975

[21] Appl. No.: 541,725

[52] U.S. Cl.................. 74/446; 74/243 DR; 74/465
[51] Int. Cl.².................. F16H 55/12; F16H 55/06; F16H 55/30
[58] Field of Search........ 74/446, 465, 447, 243 DR

[56] References Cited
UNITED STATES PATENTS

| | | | |
|---|---|---|---|
| 1,433,923 | 10/1922 | Anthony | 74/448 |
| 3,069,922 | 12/1962 | Harvey | 74/243 DR |
| 3,108,488 | 10/1963 | Huszar | 74/447 X |
| 3,861,232 | 1/1975 | Bravin | 74/446 |

Primary Examiner—Leonard H. Gerin
Attorney, Agent, or Firm—Ralph R. Roberts

[57] ABSTRACT

This invention pertains to tooth transmission members in which the tooth member is mounted to a support member and the tooth or pocket is used to drive or be driven by roller chains and the like. A base member is provided and is usually a form blank such as a disc or length of metal to which is secured assembled preforms in a linked array. Each preform provides a roller receiving tooth profile. The linked preforms are tightly retained on the previously prepared base members. Any selected number of preforms may be used and at least one is secured to the support blank upon which they are mounted. The support blank may be regularly or irregularly shaped depending upon the desired resulting transmission member.

9 Claims, 9 Drawing Figures

U.S. Patent  Jan. 27, 1976  3,934,484
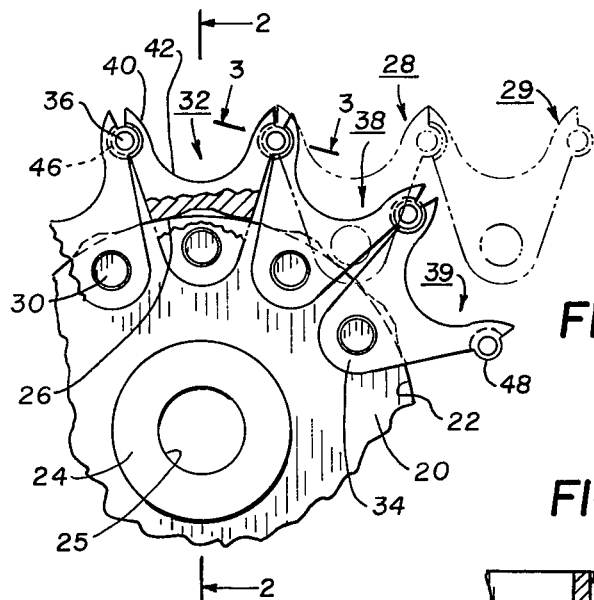
FIG. 1
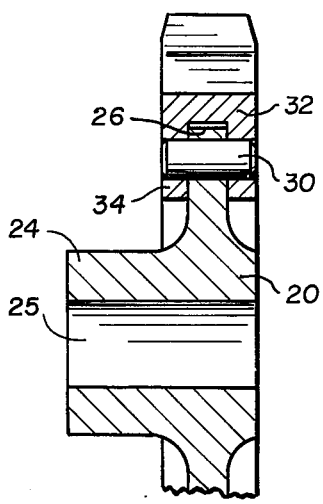
FIG. 2
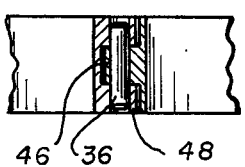
FIG. 3
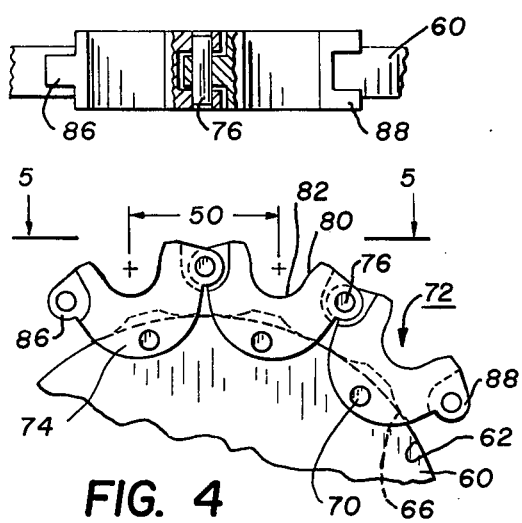
FIG. 4 / FIG. 5
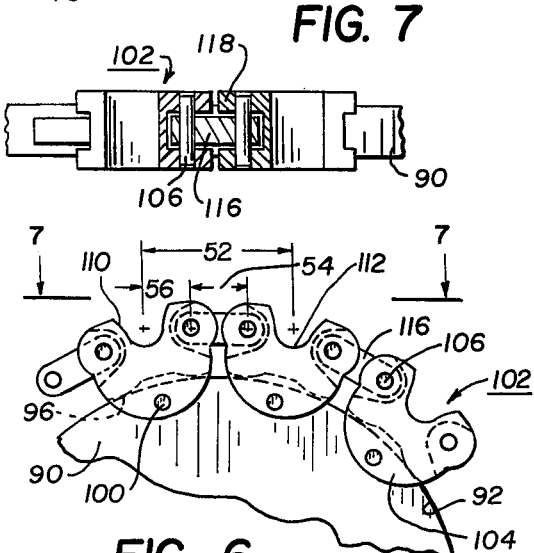
FIG. 6 / FIG. 7
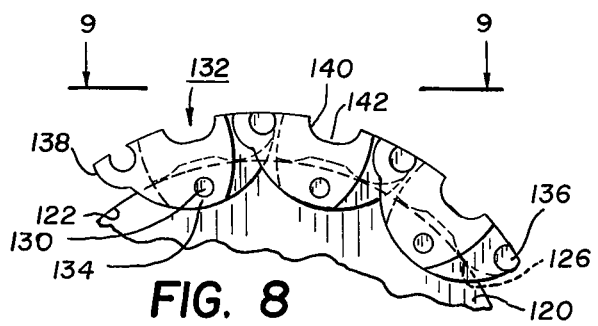
FIG. 8
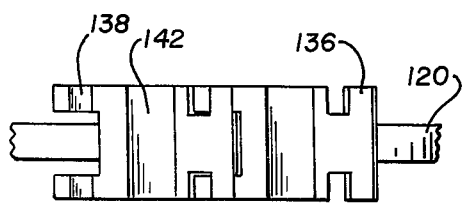
FIG. 9

TOOTH TRANSMISSION MEMBER UTILIZING PIVOTALLY INTERCONNECTED PREFORMS

CROSS-REFERENCE TO RELATED APPLICATIONS

This invention pertains to a transmission member similar to that shown in my U.S. patent application entitled, "Transmission Member Utilizing Pivotally Interconnected Preforms", Ser. No. 404,132, filed Oct. 5th, 1973 and given U.S. Pat. No. 3,861,232 as issued on Jan. 21st, 1975.

BACKGROUND OF THE INVENTION

1. Field of the Invention

With reference to the classification of art as established in the U.S. Patent Office this invention is found in the general Class entitled, "Machine Elements and Mechanisms" (Class 74) and more particularly in the subclass entitled, "gearing roller" (Subclass 465).

2. Description of the Prior Art

Spur gears, tooth pulleys, gear racks, roller chains and sprockets are all well known in the power transmission art. In my U.S. Pat. No. 3,861,232, above-identified, a complete description of assembled preforms for use with toothed timing belts and the like have been both described and claimed. Not shown was the simplified method of providing roller chain sprockets which could be assembled and mounted in a manner similar to that shown for the transmission member in the above-identified patent. To the extent that it applies the information disclosed and claimed in my above-identified patent is incorporated by reference into this application.

The use of a length of roller chain mounted to a support blank is shown in U.S. Pat. No. 3,108,488 to HUSZAR as issued on Oct. 29th, 1963. In this and prior known art, insofar as is known, no attempt has been made to provide a tooth sprocket in which the teeth are pivotally connected and are removably mounted on the support member. The assembled sprocket has teeth whose spacing and shape are positive and precise.

The present invention provides a ready and inexpensive means for making and assembling positive tooth sprockets which may be utilized with single pitch or multipitch roller chains. Preformed tooth members are precisely spaced from each other by connecting links or by mating hinge portions and are supported and retained on a suitable support blank so that each preform is secured at the required relationship to a supplied support surface. The tooth preform is attached to the outer portion of the support blank to provide an established pitch line. Alternately the support blank may have a groove in which the preform is maintained in a similarly fixed and spaced relationship. A series of preforms when secured to the support blank provides a complete tooth sprocket. It is further contemplated that the preforms may be mounted upon an expanding-type support which would provide a variable tooth sprocket drive.

SUMMARY OF THE INVENTION

This invention may be summarized at least in part with reference to its objects.

It is an object of this invention to provide, and it does provide, a transmission member providing a tooth sprocket profile in which the teeth are precisely spaced from each other by pivoting means or attached links and are secured to the support member by means of securing pins or a frictional engagement.

The positive drive member of this invention utilizes a preform which forms at least one tooth portion on its outer face. The underportion of this preform is precisely made so as to be positively positioned on a support surface. Several embodiments are shown to indicate the method by which these preforms may be precisely spaced, connected and mounted. The support member may be a disc, a cam-shaped member of a regular shape or irregular form or may be a rack. The support member is formed to provide a base for the preform so as to establish a desired pitch and configuration. In the embodiments to be hereinafter more fully described the preform is secured to the support member by means of a pin, an orienting pin, a locating pin or by forcing into a receiving groove or, of course, by adhesive means.

In addition to the above summary the following disclosure is detailed to insure adequacy and aid in understanding of the invention. There have been chosen specific embodiments of the preforms which provide a tooth profile which is compatible for use with roller chains of either single or multiple pitch. These specific embodiments have been chosen for the purposes of illustration and description as shown in the accompanying drawing wherein:

BRIEF DESCRIPTION OF THE DRAWING

FIG. 1 represents a side view, partly fragmentary, and showing a connected series of like preforms some of which are attached and some are in the process of being attached to a support member;

FIG. 2 represents a fragmentary sectional view taken on the line 2—2 of FIG. 1 and looking in the direction of the arrows;

FIG. 3 represents a fragmentary view taken on the line 3—3 of FIG. 1 and looking in the direction of the arrows;

FIG. 4 represents an alternate construction of a tooth preform, this assembly of tooth preforms adapted to drive roller chains having a multipitch as, for example, double pitch;

FIG. 5 represents a fragmentary plan view looking downwardly on the fragmentary view of FIG. 4, this view taken on the line 5—5 of FIG. 4 and looking in the direction of the arrows;

FIG. 6 represents an alternate tooth construction to that of FIG. 4 and in this tooth construction additional connecting links are employed;

FIG. 7 represents a fragmentary plan view of the tooth profile construction of FIG. 6, this view taken on the line 7—7 of FIG. 6 and looking in the direction of the arrows;

FIG. 8 represents a side view of yet another alternate tooth construction for multipitch sprockets having a low profile, and FIG. 9 represents a plan view of the sprocket construction of FIG. 8, this view taken on the line 9—9 of FIG. 8 and looking in the direction of the arrows.

In the following description and in the claims various details will be identified by specific names for convenience, these names, however, are intended to be generic in their application. Corresponding reference characters refer to like members throughout the several figures of the drawing.

The drawing accompanying, and forming part of, this specification discloses a preferred construction but it should be understood that these details may be modified in various respects without departure from the concept and principles of the invention.

DESCRIPTION OF THE EMBODIMENT OF FIGS. 1, 2 and 3

Referring now to the drawing and in particular to FIGS. 1, 2 and 3, there is depicted a support member 20 which, as shown, is a disc-like member preferably made with an outer diameter or periphery 22 of a precise measurement. Conventionally a hub 24 and a bore 25 are provided and these may be of a selected size for mounting and retaining on a shaft, not shown. Arcuate surfaces 26 are formed on the under or inner face of the preforms, to be hereinafter more fully described. For the sake of identification, in phantom outline are shown preforms 28 and 29 which are in a preassembled condition prior to their mounting on the support member 20. Locking pins 30 pass through holes formed in the support member 20 to secure preform 32 which is typically, substantially identical or identical to the preforms 28 and 29, shown in phantom outline. Each preform is sequentially secured to the support member 20. The tooth preform 32 and like preforms have mounting side flange portions 34 which slidably engage the web portion of the support member 20. Mating hinge ears identified as tang portions 46 and leaf portions 48 are formed on the outer tooth portion of the preforms 32. Pivot pins 36 passed through holes in members 46 and 48 are secured to the preforms in a fixed relationship to each other. As the preforms are positioned on the support member, locking pins 30 are passed through the mounting flange portions 34 and through appropriately drilled holes in the web of the support member 20 to secure the preforms in position. As seen in FIG. 1, after preform 32 has been secured to the web portion of support member 20 by means of locking pin 30, the preform 28, in preassembled position, is moved to the support member 20 and becomes preform 38 when mounted by pin 30. In a like manner, the preform 29, shown in dashed outline, is moved into seated condition on the support member 20 and is secured in position by means of locking pin 30 to become an assembled preform 39. The hinge relationship of the tang portions 46 and leaf portions 48 is a sliding mating fit. The relationship of the tang and leaf is particularly seen in the sectional view of FIG. 3 where the tang 46 and leaf 48 are retained by means of pivot pin 36.

EMBODIMENT OF FIGS. 4 AND 5

Referring next to the embodiment of FIGS. 4 and 5, it is to be noted that in FIGS. 4 and 5 there is represented a sprocket whose teeth are adapted to mate with a roller chain commonly identified as a multiple pitch, as for example, a double pitch or triple pitch. Assuming that the distance 50, indicated on FIG. 4, has a spacing for double distance (double the normal spacing) roller chain, then the preform 72 may be formed so that instead of a sharp tooth a large space may be provided. This space is equal to the omitted roller of the roller chain. In this space is accommodated a locking pin 70 which retains preform 72 mounted to a support member 60. Instead of the sharply pointed tooth of FIG. 1, the hingedly joined preforms of FIG. 4 which are seated on the support member 60 and on its outer periphery 62 provide the seating portions of the preform 72 as well as larger hinging portions. Locking pins 70 will retain these preforms to the support member 60. Pivot pin 76 will lock the several preforms and provide the pivotal connection of the preforms. The tang 86 and mating leaf portions 88 are hinged portions which are secured by means of the pivot pin 76. The tooth profile 80 and the trough profile 82 of the preform are adapted to receive that roller of the chain having the extended spacing.

EMBODIMENT OF FIGS. 6 AND 7

Referring now to FIGS. 6 and 7, it is to be noted that an alternate construction to the preform of FIG. 4 is provided. Instead of a hinge connection of one preform to the next preform there is depicted on support member 90, having a periphery 92, mounted preforms having link connecting members. The arcuate support surfaces 96 of preforms 102 are seated on the surface 92. These preforms are secured to the support member by means of locking pins 100. Flange portions 104 straddle the web of this support member. Links 116 extend between the preforms 102 and into recesses formed in the upper leaf portion 118 of the tooth profile 110. The trough of the profile is identified as 112 and is adapted to receive the roller of a chain of multiple pitch. It is to be noted that the distance indicated as 52 may be two, three or more pitches and the link distance 54 plus the two distances 56 establish the pitch of the roller chain to which this sprocket is adapted to operate and drive. The link distance is a function of the pitch distance, hence the link length may be shortened or lengthened to accommodate the different multiple pitch chains with no change in the preform 102.

EMBODIMENT OF FIGS. 8 AND 9

Referring next and finally to the embodiment of FIGS. 8 and 9, there is depicted a sprocket for a roller chain in which the tooth preforms have integrally formed male and female connecting portions. As seen in FIGS. 8 and 9, a support member 120 has a periphery 122 which provides a support for the arcuate surfaces 126 of a preform 132. Locking pins 130 retain these preforms to the support member 120 and mounting flanges 134 formed on the preform straddle the web of the support member. The preform 132 has the upward extending tooth profile 140 and a trough profile 142 which is sized to receive the roller of a multipitch roller chain. Hinge pockets 138 are formed on one of the upward extending portions of tooth profile portion 140 and on the other upward extending tooth profile portion there are formed hinge ear projections 136. The projections 136 seat in the hinge pockets 138 to form a pivoted connection which when the preforms 132 are secured to the base 120 by means of locking pins 130 retain this multipitch sprocket configuration in a fixed position upon the support member 120. Relief portions are provided in the sides of the preforms to enable the projections 136 to be seated in pockets 138 as the last connection of a sprocket is secured. This embodiment discloses a low profile toothed sprocket which may be desirable in certain conveyar chain drives. This manner of connection can also be employed in the embodiments of FIGS. 1 and 4.

Although FIGS. 2, 4, 6 and 8 all suggest that the preform have exterior mounting flanges which slidably engage the web of a support member it is also to be contemplated that a reverse of this might be provided in which this support member might have a groove formed therein in which the tooth projection may be seated and by means of locking pins and hinge pins the preforms will be secured to the support member.

Terms such as "up", "down", "bottom", "top", "front", "back" and the like are applicable to the embodiments shown and described in conjunction with the drawing. These terms are merely for the purposes of description and do not necessarily apply to the manner in which the tooth transmission member may be constructed or used.

While particular embodiments have been shown and described modifications may be made within the scope of the accompanying claims and protection is sought to the broadest extent the prior art allows.

What is claimed is:

1. A transmission member which is sequentially assembled to provide the tooth engaging portions of a power transmission sprocket for use with roller chain and the like, said sprocket having a profiled intermediate section which in a mounted condition cooperatively engages the roller and like portions of a roller chain transmission member, said member including: (a) a support member having a prepared support means of selected configuration; (b) a preform having a midportion containing a positive power transmission profile formed in its outwardly facing portion, said profile providing a roller receiving contour, the preform having means for precisely engaging the support member; (c) retaining means provided on said preforms to cooperatively engage the support member and maintain this preform in a fixed condition on said member, and (d) hinge means formed in each of the two upwardly extending portions of the preform, said hinge means cooperatively secured to the next preform by a hinge retaining member, the hinge when connected forming a pivotal connection by which the preform is retained in a spaced relationship to the next adjacent preform.

2. A transmission member as in claim 1 in which the preform has side portions providing flanges which slidably engage the sides of the support member and provide a transverse retention of the preform on the support member.

3. A transmission member as in claim 2 in which the preform is adapted to receive a roller chain and at the upward end of the preform the end is connected by means of a hinge pin.

4. A transmission member as in claim 3 in which the transmission member provides a sprocket for a regular pitch roller chain.

5. A transmission member as in claim 2 in which the central portion of the preform is adapted to receive the roller of a multipitch roller chain and the upward extending portion of the preform and its hinge connection occupy the space of at least one missing roller of a multipitch roller chain.

6. A transmission member as in claim 2 in which the preform has a midportion adapted to receive the roller of a multipitch roller chain and in which the upward extending portion of the preform is connected to the next preform by means of a link member, said upward extending portion of the preform and the connecting link occupying the space of at least one missing roller of a multipitch roller chain.

7. A transmission member as in claim 2 in which the midportion of the preform is adapted to receive substantially one-half of the diameter of the roller chain and in which the upward extending end of the preform is formed with integral hinge portions, one of the ends of the upward extending preform having a pair of hinge sockets formed therein and in which the other upward extending portion of the upward projection of the preform has a hinged ear projection adapted to seat in the open upward pocket formed on the preform.

8. A transmission member as in claim 7 in which the hinged ear projection and the hinge pockets lay substantially at the pitch line of the roller chain.

9. A transmission member as in claim 8 in which the roller chain receiving preforms is spaced to receive only multipitch roller chains.

* * * * *